(12) United States Patent
Sakigawa et al.

(10) Patent No.: US 10,371,369 B2
(45) Date of Patent: Aug. 6, 2019

(54) SEALING OF OPTICAL MODULE WITH O-RING AND LIQUID RESIN

(71) Applicant: HITACHI-LG DATA STORAGE, INC., Minato-ku, Tokyo (JP)

(72) Inventors: Yukio Sakigawa, Tokyo (JP); Masayuki Okamura, Tokyo (JP); Hiroaki Furuichi, Tokyo (JP); Hiroshi Ogasawara, Tokyo (JP); Kenji Watabe, Hitachi (JP); Fumihito Ichikawa, Tokyo (JP); Tatsuya Yamasaki, Tokyo (JP)

(73) Assignee: HITACHI-LG DATA STORAGE, INC., Tokyo (JP)

( * ) Notice: Subject to any disclaimer, the term of this patent is extended or adjusted under 35 U.S.C. 154(b) by 765 days.

(21) Appl. No.: 14/796,890

(22) Filed: Jul. 10, 2015

(65) Prior Publication Data
US 2016/0033122 A1 Feb. 4, 2016

(30) Foreign Application Priority Data

Aug. 1, 2014 (JP) .................. 2014-157554

(51) Int. Cl.
| | |
|---|---|
| *F21V 31/00* | (2006.01) |
| *F21V 29/54* | (2015.01) |
| *G03B 21/20* | (2006.01) |
| *G03B 21/14* | (2006.01) |
| *G02B 27/01* | (2006.01) |
| *G03B 17/08* | (2006.01) |

(52) U.S. Cl.
CPC ............ *F21V 31/005* (2013.01); *F21V 29/54* (2015.01); *G03B 21/145* (2013.01); *G03B 21/20* (2013.01); *G02B 27/01* (2013.01); *G03B 17/08* (2013.01); *G03B 21/2033* (2013.01)

(58) Field of Classification Search
CPC ...................................................... F21V 31/005
USPC ....................................................... 362/158
See application file for complete search history.

(56) References Cited

U.S. PATENT DOCUMENTS

| 6,407,925 B1 | 6/2002 | Kobayashi et al. |
| 2002/0112870 A1 | 8/2002 | Kobayashi et al. |
| (Continued) | | |

FOREIGN PATENT DOCUMENTS

| JP | S61-174766 | 8/1986 |
| JP | 2001-85866 A | 3/2001 |
| (Continued) | | |

OTHER PUBLICATIONS

European Search Report for corresponding European Application No. 15001923.0-1560 (dated Dec. 15, 2015).

*Primary Examiner* — Gerald J Sufleta, II
(74) *Attorney, Agent, or Firm* — Miles & Stockbridge PC

(57) ABSTRACT

An optical module having a high-moisture-proof package structure in which dew condensation does not occur is provided.
An optical module includes optical components including a light source, a pedestal on which the optical components are mounted, a cover which is combined to the pedestal to seal the optical components, and an emitting window disposed in the cover to take light from the light source outside. The pedestal and the cover are sealed with an O ring and a liquid seal material such that a compression direction of the O ring and a compression direction of the liquid seal material are almost perpendicular to each other.

12 Claims, 4 Drawing Sheets

(56) References Cited

U.S. PATENT DOCUMENTS

| | | | | |
|---|---|---|---|---|
| 2010/0328960 A1* | 12/2010 | Wang | ................... | F21V 29/004 362/373 |
| 2012/0033696 A1* | 2/2012 | Hayashi | .............. | H01S 5/02204 372/43.01 |
| 2013/0223059 A1* | 8/2013 | Miller | .................... | F21V 15/01 362/231 |
| 2014/0293430 A1* | 10/2014 | Takahashi | ............ | G03B 21/005 359/630 |
| 2015/0369469 A1* | 12/2015 | Vamberi | ................ | F21S 8/022 362/153.1 |
| 2016/0018098 A1* | 1/2016 | Kim | .................... | F21V 29/2212 362/373 |

FOREIGN PATENT DOCUMENTS

| | | |
|---|---|---|
| JP | 2003-14286 A | 1/2003 |
| JP | 2004-253638 A | 9/2004 |
| JP | 2009-049239 A | 3/2009 |

\* cited by examiner

F I G . 1
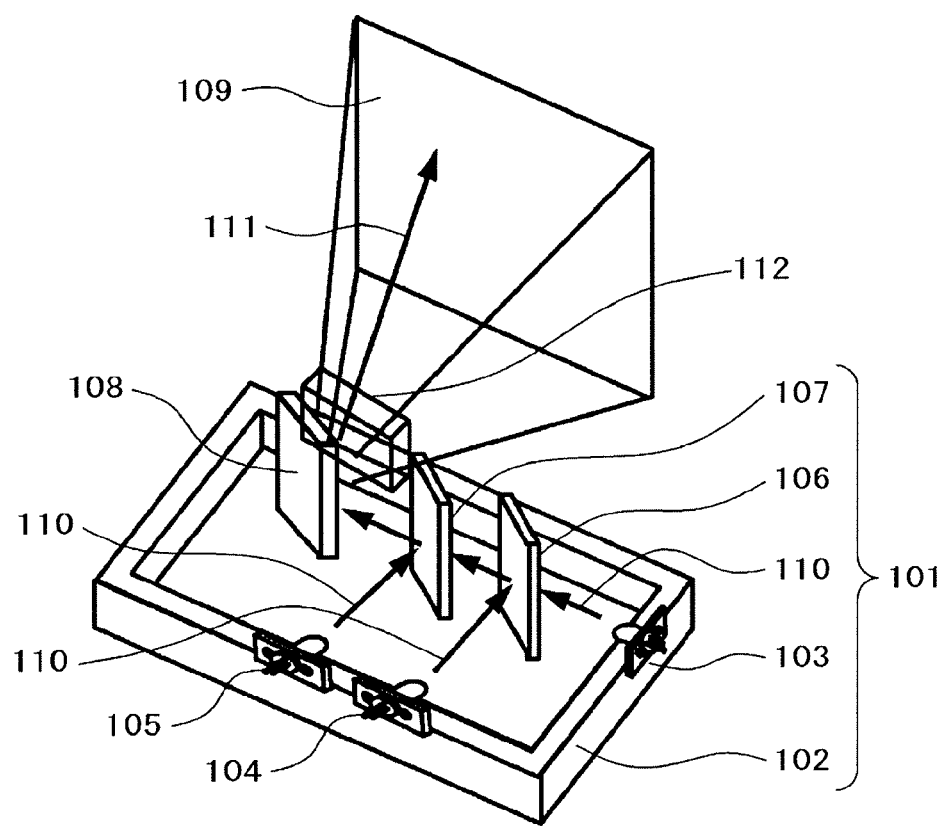

SEALING OF OPTICAL MODULE WITH O-RING AND LIQUID RESIN

CLAIM OF PRIORITY

The present application claims priority from Japanese patent application JP2014-157554 filed on Aug. 1, 2014, the content of which is hereby incorporated by reference into this application.

BACKGROUND OF THE INVENTION

1. Filed of the Invention

The present invention relates to a package structure of an optical module for a video output device and a method of making the same.

2. Description of the Related Art

As techniques related to the present invention, Japanese Unexamined Patent Publication No. 2003-14286 (Patent Document 1) discloses a technique that "includes a blow-out unit having a frame member forming warm air blow-out port and a motor housing box coupled to the frame member, a wind direction adjusting louver rotatably supported on the frame member, and a louver driving stepping motor housed and fixed in the motor housing box, wherein a rotating shaft of the wind direction adjusting louver is inserted into a bearing unit penetrating a frame member forming the motor housing box, and is coupled to a drive shaft of the stepping motor housed and fixed in the motor housing box in a state in which an O ring is sandwiched between an end face of the bearing unit and a casing of the stepping motor (see the abstract)".

Japanese Unexamined Patent Publication No. 2001-85866 (Patent Document 2) discloses a technique wherein "a case of an electronic control device includes a case body which has an opening formed in an upper surface thereof and houses a printed circuit board, a cover a made from a thin board to close the opening of the case body, a groove formed in an opening edge of the case body, and a liquid seal material which filled in the groove to seal a boundary between the opening edge of the case body and a flange of the cover, and the flange of the cover includes a protrusion having a nearly U-shaped section and disposed to be fitted in the groove of the case body (see the abstract).

SUMMARY OF THE INVENTION

FIG. 1 shows a schematic diagram of an optical module serving as a video output device as an example. FIG. 1 is an example of a perspective view of the optical module. The optical module employs a scheme in which optical components are fixed to a housing 102 by using an adhesive agent. As main optical components of the optical module, a laser diode (green) 103, a laser diode (red) 104, a laser diode (blue) 105, an RGB combining mirror 106, an RGB combining mirror 107, and an MEMS mirror 108 are given. The components configure an optical engine unit 101 as a whole. In FIG. 1, reference numeral 109 denotes a projection screen, reference numeral 110 denotes an optical path, reference numeral 111 denotes a video image, and reference numeral 112 denotes an emitting window.

FIG. 2 shows an upper view of a conventional structure of the optical module, and FIG. 3 shows a side view of the conventional structure. On an optical module housing 201, as optical components, laser diodes (LDs) 203, an MEMS mirror 204, and an RGB combining mirror 205 are mounted. A module cover 202 has an emitting window 207 formed therein. Mirrors and lenses are not illustrated.

In this manner, since the three LDs 203 each of which generates a large amount of heat are disposed, heat is easily generated in the module. Thus, as shown in FIG. 3, a structure in which a Peltier element (for cooling LD) 206 is attached immediately below the optical module housing 201 is employed to make it possible to cool the LDs 203. For example, when the optical module is used in an automobile and installed on a dashboard in the automobile, in accordance with heat generation by the laser diodes themselves, an environmental temperature around an RGB module becomes high. However, the LDs 203 are cooled with the Peltier element (for cooling LD) 206 to make it hard to cause a defect such as a hindrance of turning on the LD.

However, when the optical module is used in, for example, an automobile and installed on a dashboard in the automobile, the inside of the module cover 202 which is a closed space is cooled with the Peltier element 206, but the outside (environment) of the module cover 202 has a high temperature (55° C. to 85° C.). For this reason, an amount of saturated steam becomes small, and dew condensation easily occurs. When dew condensation occurs in the module cover 202 to cause drops of water to adhere to the optical components, especially, the light emitting window 207 and the MEMS mirror 204 closely related to a normal operation, the MEMS mirror 204 defectively operates, or the emitting window 207 is misted to cause a drawback such as the out-of-focus video image 208.

As a structure to prevent dew condensation, a moisture-proof structure using an O ring disclosed in Patent Document 1 is given. However, in a motor described in Patent Document 1, since a defective operation occurs due to the progression of corrosion of members caused by dew condensation, dew condensation does not immediately cause the defect. On the other hand, in an optical module such as an RGB module, since a misted light emitting window causes a defect such as an out-of-focus projected image, occurrence of dew condensation immediately causes the defect. As described above, the optical module requires a severe moisture-proof capability. The request cannot be completely satisfied by the structure disclosed in Patent Document 1.

In a water-proof structure disclosed in Patent Document 2, an outgas component generated from the liquid seal material adheres to the mirrors or the emitting window to cause a defective operation. For this reason, the water-proof structure cannot be applied to a package structure for optical module.

In an optical communication module or the like, airtight sealing is performed with low-melting glass or welding. When sealing is performed by welding a metal or glass, moisture can be completely prevented from entering the optical communication module. However, the costs become higher than those in the embodiment, and the RGB module is larger than the optical communication module to increase a welding area. For this reason, a fault occurs to easily cause leakage, and a welding material for sealing is additionally required.

The present invention has as its object to solve the above problems and to provide an optical module having a high-moisture-proof package structure which does not cause dew condensation inside an optical module.

In order to solve the above problems, the present invention employs the configuration described in claims.

The present invention includes a plurality of means for solving the above problems. As an example of an optical module according to the present invention, there is provided an optical module including optical components including a light source, a pedestal on which the optical components are mounted, a cover which is combined to the pedestal to airtightly seal the optical components, and an emitting window which is formed in the cover to take light from the light source outside, wherein the pedestal and the cover are sealed with an O ring and a liquid seal material such that a compression direction of the O ring and a compression direction of the liquid seal material are almost perpendicular to each other.

As an example of a method of making an optical module according to the present invention, there is provided a method of making an optical module including optical components including a light source, a pedestal on which the optical components are mounted, a cover which is combined to the pedestal to airtightly seal the optical components, and an emitting window which is formed in the cover to take light from the light source outside, including the step of preparing a pedestal having a step portion to dispose an O ring thereon and a groove in which a liquid seal material is applied on an outer peripheral side of the step portion to fit the cover in the groove, the step of disposing the O ring on the step portion, the step of applying or disposing the liquid seal material in the groove, and the step of fitting the cover in the groove to press the liquid seal material into the groove.

As an example of another method of making an optical module according to the present invention, there is provided a method of making an optical module including optical components including a light source, a pedestal on which the optical components are mounted, a cover which is combined to the pedestal to airtightly seal the optical components, and an emitting window which is formed in the cover to take light from the light source outside, including: the step of preparing a pedestal on which an O ring is disposed and which has a groove to apply a liquid seal material on an outer peripheral portion of the O ring; the step of disposing the O ring on an inner peripheral side of the groove; the step of applying or disposing the liquid seal material on the outer peripheral side of the groove; and the step of fitting the cover in the groove to press the liquid seal material into the groove.

According to the present invention, a highly reliable package for optical module can be achieved.

BRIEF DESCRIPTION OF THE DRAWINGS

FIG. 1 is an example of a perspective view of a block diagram showing a conventional optical module.

DETAILED DESCRIPTION OF THE INVENTION

Figure 2:
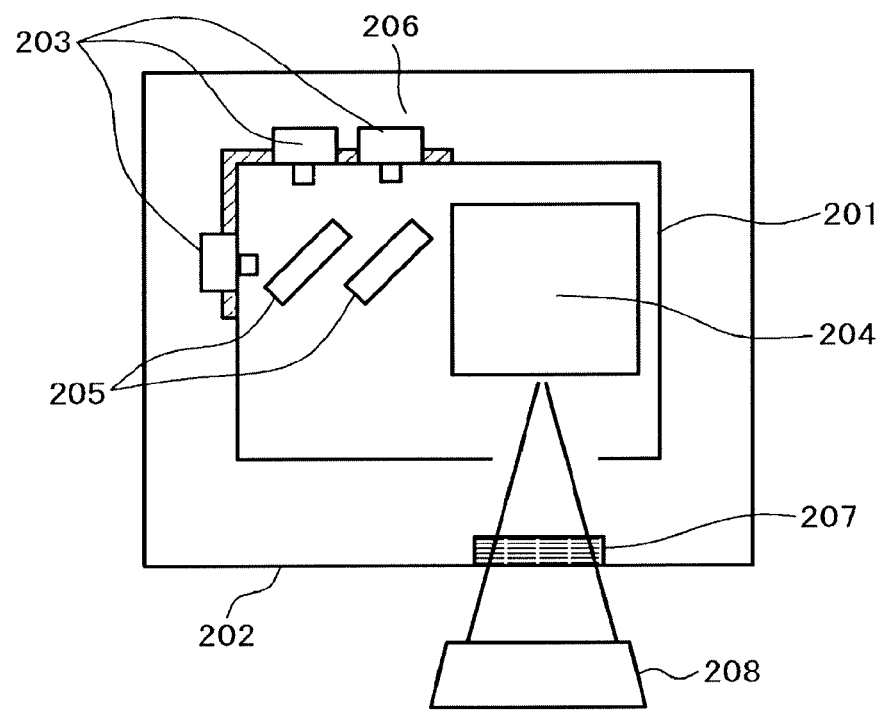
FIG. 2 is an upper view showing the structure of the conventional optical module.
Figure 3:
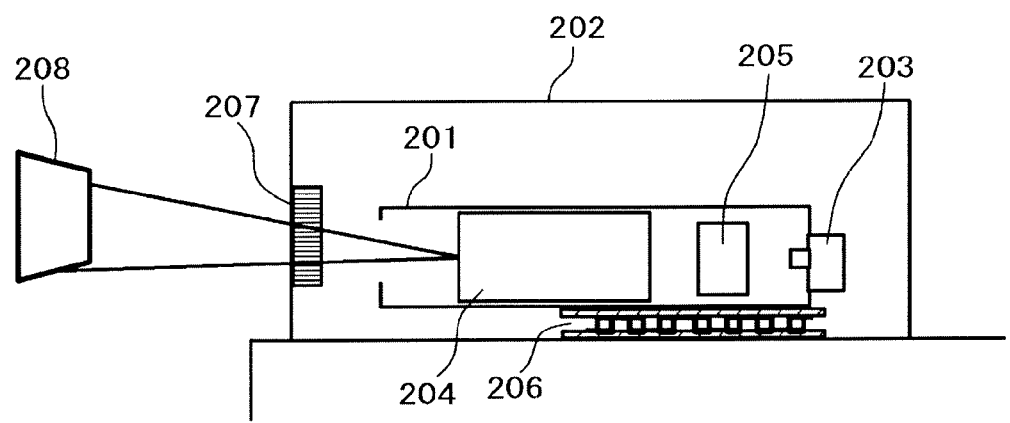
FIG. 3 is a side view showing the structure of the conventional optical module.
Figure 4:
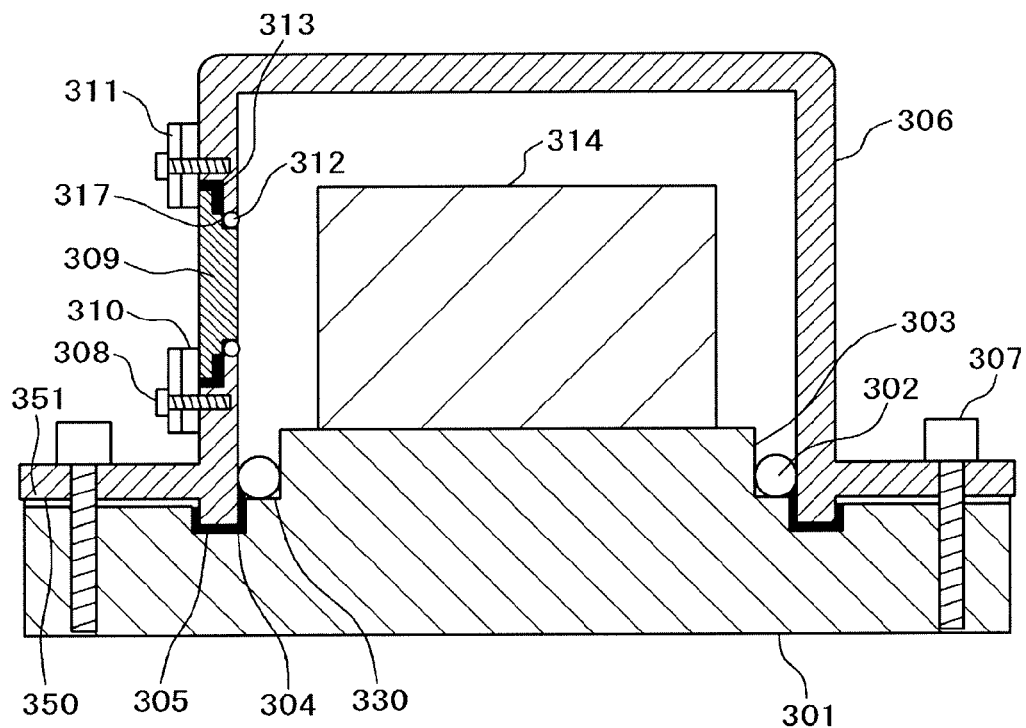
FIG. 4 is a side view showing an optical module according to a first embodiment of the present invention.

Embodiments of the present invention will be described below in detail with reference to the accompanying drawings.
First Embodiment A first embodiment will be described with reference to FIG. 4. FIG. 4 is a side view showing an optical module according to the first embodiment. Note that the MEMS mirror 204, the laser diode 203, and the RGB combining mirror 205 shown in FIG. 3 are collectively illustrated as optical components 314. The Peltier element 206 and the lenses are not illustrated.

In the first embodiment in FIG. 4, a step 303 to dispose an O ring 302 on a peripheral portion of a pedestal 301 (base) is formed. The step 303 preferably has a height larger than a diameter of the O ring 302. This is because, in positioning performed with a screw 307 and a module cover 306 (will be described later), when the O ring 302 is transformed with pressure to partially enter the inside of the step 303, the airtightness is deteriorated. For this reason, the step having a height larger than the diameter of the O ring 302 is used to make it possible to prevent the O ring 302 from taking over the step 303. For example, a structure is desirably designed such that the thickness of an O ring and the height of a step are set to a diameter of 2 mm and 3 mm, respectively. As a material of the O ring, a fluorocarbon resin, a styrene resin, or the like can be used.

A groove 305 to apply a liquid seal material 304 is formed in an outer peripheral portion of the step 303. As a source material of the liquid seal material, an olefine or silicon resin or the like can be used. Furthermore, an ultraviolet-curing resin may also be used. In this case, since the material is hardened by irradiating an ultraviolet ray thereon, a curing time is short. For this reason, this can contribute to improvement in manufacturing tact. In the first and second embodiments, the groove 305 has a recessed shape, and has a U-shaped space by inserting the module cover 306 into the groove 305. More specifically, the liquid seal material is formed to have a U shape.

Although the step 303 is not illustrated here, the step 303 has a rectangular shape. The rectangular or square step 303 can be easily manufactured and processed. The step 303 need only have a shape on which the optical components 314 can be mounted, and the step 303 may be circular or elliptic. In this case, the O ring 302 has no corner portion to advantageously prevent even the transformed O ring from being strongly transformed at the corner portion. In addition, the O ring 302 need not be processed to form a corner portion therein.

A method of attaching the module cover 306 will be described here.

First, the O ring 302 is disposed on an O-ring disposing portion 330 arranged on the pedestal 301 on which the optical components 314 are mounted. Thereafter, the liquid seal material 304 is applied or disposed in the groove 305. The O-ring disposing portion 330 is desirably planar. Actually, the O-ring disposing portion is nearly planar. The thickness of the O ring 302 is desirably larger than that of the O-ring disposing portion 330. The O ring is transformed by pressuring the O ring to extend in vertical directions. For this reason, the horizontal width of the transformed O ring 302 is almost equal to the width of the O-ring disposing portion. In this manner, outgas (will be described later) can be prevented or suppressed from entering the optical components 314 side.

The module cover 306 is disposed. The module cover 306 has a screw 308, an emitting window 309, a rubber packing 310, a lid 311, a window O ring 312, and a liquid seal material 313 which are collectively called as a window unit. In the first embodiment, a method of attaching these configurations will not be described. In FIG. 4, as the configurations of the window unit, the screws are used. However, as the window unit, a so-called permanently set window may be used, and a window need only be formed in an emitting direction of the optical components 314. This is because the groove 305 and the module cover 306 can be aligned.

The configurations of the window unit such as a lid are desirably attached before the module cover 306 is disposed. This is because, when the configurations of the window unit are attached at that time, the optical module can be easily assembled. If the configurations of the window unit are not attached, outgas (will be described later) may enter the optical components 314 side through the window unit.

A projecting portion of the module cover 306 is fitted in the groove 305 of the pedestal 301 to press the liquid seal material 304 into the groove. In this case, the projecting portion of the module cover 306 has an uneven shape corresponding to the groove 305, and the diameter of the projecting portion of the module cover 306 is configured to be smaller than the recessed portion of the groove 305. This is because the module cover 306 cannot be fitted in the groove 305 without that relationship. When the recessed portion is excessively large, as the liquid seal material 304 to be filled in the groove 305, a larger amount of liquid seal material is used to disadvantageously increase an amount of outgas. For this reason, the diameter of the each of the projecting portions of the uneven shape is desirably close to the size of the recessed portion as much as possible. For example, the projecting portions and the recessed portion need only have a relationship to have a gap having a diameter of 0.5 mm or more. Although the diameter is used as each of the dimensions of the uneven shape, the projecting portions need not be circular and may be square, rectangular, or triangular, widths of the projecting portions of the uneven shape are different from each other, the thicknesses of sections of the uneven shape may be different from each other, or the widths of the sections of the uneven shape may be different from each other as long as the projecting portion of the module cover 306 can be fitted in the uneven shape, i.e., as long as the projecting portion enters the recessed portion. These components are not limited to components corresponding to each other, a combination between a conical projecting portion and a square recessed portion may be used.

The arrangements or alignments of the optical module 306 are desirably performed in an environment containing a small moisture content. As will be described later, since a space including the optical components 314 is closed with the liquid seal material 304 and the screw 307, once moisture enters the space, the moisture is difficult to be removed from the space. This is because it is not assumed that the window unit and the screw 307 are removed in maintenance or the like.

On the other hand, the liquid seal material 304 is compressed in the direction of thickness of the pedestal 301 by fixing the module cover 306 and the pedestal 301 to each other with, for example, the screw 307 or the like. For this reason, the thickness of the liquid seal material 304 can be adjusted independently of the thickness of the O ring 302. With this adjustment, the O ring 302 is compressed in the radial direction of the O ring 302 by the module cover 306 and the pedestal 301. When the O ring 302 and the disposing portion have 2 mm and about 1.5 mm, respectively, the O ring 302 flattened by compression is transformed into a long narrow shape in the vertical directions. However, a part of the O ring 302 is rarely disposed on the step 303. For this reason, since the O ring 302 is compressed between the module cover 306 and the step 303 to make it difficult to disperse force onto the step 303 side, and the airtightness is improved. Thus, outgas can be suppressed from entering the optical module.

In this case, a pedestal supporting portion 351 and a module cover supporting portion 350 preferably face each other, and both the portions are desirably configured to be nearly planar. Although the pedestal supporting portion 351 and the module cover supporting portion 350 have uneven shapes as long as the portions have shapes corresponding to each other, it is desired that the pedestal supporting portion 351 and the module cover supporting portion 350 preferentially have shapes corresponding to each other to perform the alignment described above. This configuration is to improve the airtightness. Although the O ring disposing portion and the module cover supporting portion 350 look to be at the same level in FIG. 4, the portions need not be at the same level. Between the pedestal supporting portion 351 and the module cover supporting portion 350, a space may be formed on the groove 305 side. This is because the space can allow generated outgas to escape.

Since moisture entering the inside of the module cover 306 is correlated to the thickness of the liquid seal material 304, the thickness of the liquid seal material 304 is adjusted independently of the thickness of the O ring 302 to make it possible to suppress moisture from entering the inside of the module cover 306. As described above, dew condensation can be prevented from occurring on the optical components 314 and the emitting window 309.

When the liquid seal material 304 is thermally hardened and after the liquid seal material 304 is hardened, outgas normally containing an organic component is generated. When the outgas components adhere to the optical components 314, for example, the MEMS mirror, the RGB combining mirror, the lens, the laser diode, the emitting window 309, and the like, a defect such as an out-of-focus projection video image obtained by the optical module may occur.

For this reason, the outgas is desired to be prevented from entering the inside of the module cover 306.

In the structure according to the embodiment includes the step 303 having the O ring 302 on the inner peripheral side of the groove 305 to which the liquid seal material 304 is applied. The O ring 302 is compressed in the radial direction of the O ring 302 with the module cover 306 and the pedestal 301 to airtightly seal the inside of the module cover 306 from the outside of the module cover 306. The inside of the module cover 306 is sealed as described above to make it possible to prevent outgas generated from the liquid seal material 304 from entering the inside of the module cover 306.

By employing the structure of the first embodiment, the compression direction of the O ring and the compression direction of the liquid seal material are almost perpendicular to each other, and the thickness of the liquid seal material can be adjusted independently of the thickness of the O ring. For this reason, the airtightness of the package can be improved.

Since the airtightness can be improved, moisture can be prevented from entering the inside of the module.

The optical module is used in a video output device which projects a video image on a windshield for, in addition to an automobile, a railway car, an aircraft, or the like.

Second Embodiment

Figure 5:
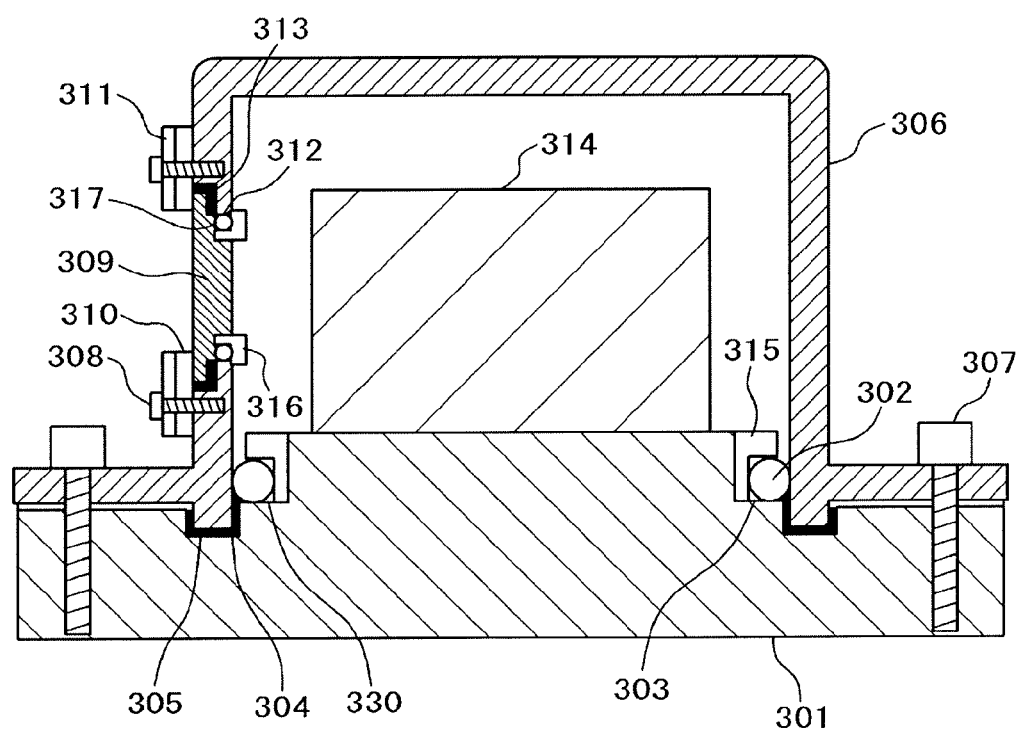
FIG. 5 is a side view showing an optical module according to a second embodiment of the present invention.

A second embodiment will be described below with reference to FIG. 5. FIG. 5 is a side view showing an optical module according to the second embodiment. The MEMS mirror 204, the laser diode 203, and the RGB combining mirror 205 which are shown in FIG. 3 are collectively illustrated as the optical components 314. The Peltier element 206 and the lens are not illustrated.

In the second embodiment, in addition to the constituent elements 301 to 314 according to the first embodiment shown in FIG. 4, an L-shaped O-ring torsion prevention stopper 315 is disposed on the outer peripheral side of the step 303 formed on the pedestal 301. Furthermore, an O-ring torsion prevention stopper 316 is disposed on the outer peripheral side of a step 317 of the emitting window 309. The O-ring torsion prevention stopper 316 is not always required. This is because, as described in the first embodiment, when the window is configured by a so-called permanently set window or a window fixed with an adhesive agent, the embodiment can be achieved without using the stopper.

When the module cover 306 is fitted on the outer peripheral side of the O ring 302 by using the O-ring torsion prevention stopper 315, the O ring 302 can be prevented from being twisted to prevent the airtightness between the module cover 306 and the pedestal 301 from being deteriorated.

The O-ring torsion prevention stopper 316 disposed on the outer peripheral side of the step 317 disposed on the emitting window 309, like the O-ring torsion prevention stopper 315, prevents the window O ring 312 from being twisted to make it possible to suppress the airtightness between the module cover 306 and the pedestal 301 from being deteriorated.

A method of making a package structure for optical module is as follows. First, the O ring torsion prevention stopper 315 is fitted on the outer peripheral side of the step 303. The O ring 302 is fitted on the outer peripheral side of the O-ring torsion prevention stopper 315. The O-ring torsion prevention stopper 316 is fitted on the outer peripheral portion of the step 317 of the emitting window 309, and the window O ring 312 is fitted on the outer peripheral portion of the O-ring torsion prevention stopper 316. It is supposed that the window O ring has about 1 mmΦ.

The liquid seal material 304 is applied to the groove 305 formed in the pedestal 301. Thereafter, the module cover 306 and the pedestal 301 are fitted to each other (combination or insertion), and the pedestal 301 and the module cover 306 are combined to each other by using, for example, the screws 307 and 308. Thereafter, the liquid seal material is thermally hardened. In terms of sealing on the emitting window side, after the liquid seal material 313 is applied to a position of the module cover 306 where the emitting window 309 is fitted, the emitting window 309 is fitted in the module cover 306. Thereafter, by using the screw 308, the rubber packing 310 and the lid 311 are fitted on the outer peripheral portion of the emitting window.

Third Embodiment

Figure 6:
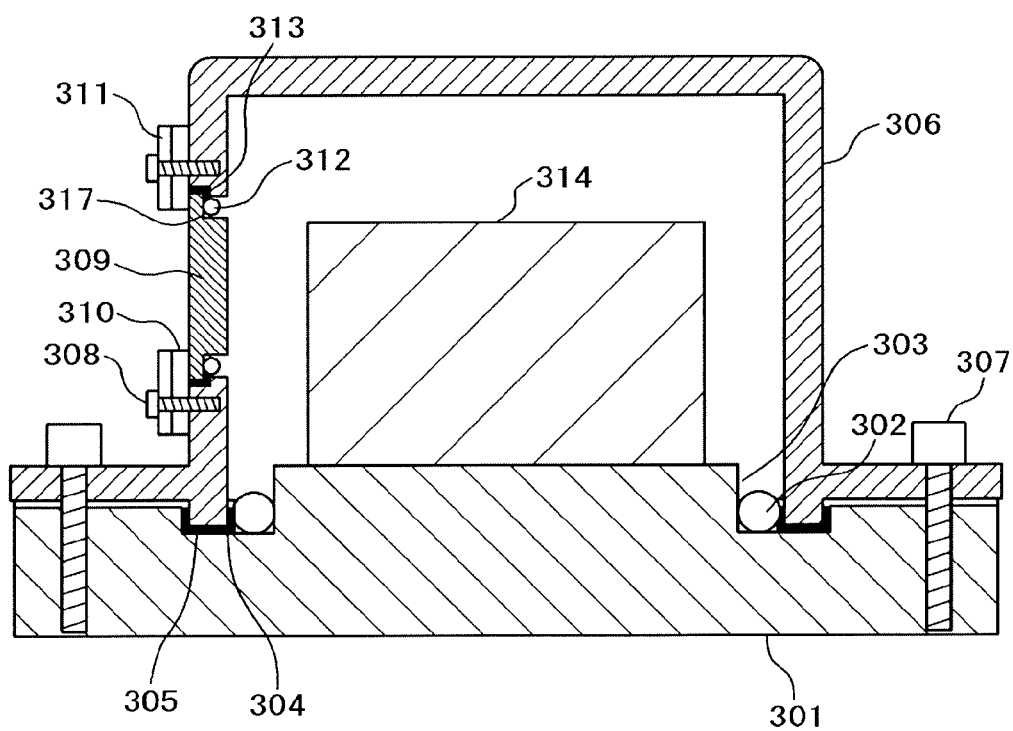
FIG. 6 is a side view showing an optical module according to a third embodiment of the present invention.

A third embodiment will be described below with reference to FIG. 6. FIG. 6 is a side view of an optical module according to the third embodiment. The MEMS mirror 204, the laser diode 203, and the RGB combining mirror 205 shown in FIG. 3 are collectively illustrated as the optical components 314. The Peltier element 206 and the lens are not illustrated.

In the third embodiment, of the constituent elements 301 to 314 according to the first embodiment shown in FIG. 4, the pedestal 301, the module cover 306, and the emitting window 309 are different in shape from those in the first embodiment.

In the first embodiment, the groove 305 and the step 303 are formed in the pedestal 301. The steps 317 are formed at two positions of the emitting window 309. Because of the complex shape, difficulty of processing disadvantageously increases, and processing costs may increase.

On the other hand, in the third embodiment, the pedestal 301 has no step, the groove 305 is formed to have an L shape, and the step 317 is formed at one position of the emitting window 309. For this reason, in comparison with the first embodiment, processing can be easily performed, and a shape which can easily decrease processing costs is achieved. The groove 305 has an L shape, and the projecting portion of the module cover 306 is combined to the L shape to form the space of the groove 305 into an L shape. For this reason, the sealed liquid seal material 304 has an L shape.

A method of making a package structure for an optical module according to the third embodiment is as follows. First, the O ring 302 is fitted on the outer peripheral side of the step 303. The O ring 312 is fitted on the outer peripheral portion of the step 317 of the emitting window 309. The liquid seal material 304 is applied to the outer peripheral side of the O ring 302 in the groove 305 formed in the pedestal 301. Thereafter, the module cover 306 is fitted on the pedestal 301, and the pedestal 301 and the module cover 306 are combined to each other by using, for example, the screws 307 and 308. Thereafter, the liquid seal material is thermally hardened. In terms of sealing on the emitting window side, the liquid seal material 313 is applied to a position of the module cover 306 where the emitting window 309 is fitted, and the emitting window 309 is fitted in the module cover 306. Thereafter, the rubber packing 310 and the lid 311 are fitted on the outer peripheral portion of the emitting window by using the screw 308. The assembling must be performed in a low-humidity environment. For example, the assembling is performed in a dry-air or nitrogen-gas atmosphere or the like.

As in the second embodiment, the L-shaped O-ring torsion prevention stopper 315 may also be used. In this case, the O ring 302 to be compressed and transformed can be prevented from being twisted, and the airtightness can be prevented from be deteriorated.

As described above, in each of the embodiments, the compression direction of the O ring and the compression direction of the liquid seal are almost perpendicular to each other, and the thickness of the liquid seal material can be adjusted independently adjusted independently of the thickness of the O ring. For this reason, the airtightness of the package can be improved.

Since the airtightness is improved, moisture can be prevented from entering the inside of the module.

The present invented by the present inventor has been concretely described above on the basis of the embodiments. However, the present invention is not limited to the embodiments, and various changes and modifications can be effected without departing from the spirit and scope of the invention as a matter of course.

What is claimed is:

1. An optical module for a video device, comprising:
   optical components including a light source;
   a pedestal on which the optical components are mounted;
   a cover which is combined to the pedestal to seal the optical components; and
   an emitting window disposed in the cover to take light from the light source outside,
   wherein the pedestal and the cover are sealed with a first O ring which is a loop of elastomer having a circular cross-section and a hardened seal of a first liquid seal material,
   wherein the first O ring is arranged at an optical components side inwardly from the first liquid seal material, and wherein a thickness of the first liquid seal material is adjustable with a screw that fixes the cover to the pedestal.

2. The optical module according to claim 1, wherein a sealing of the pedestal and the cover is performed such that a compression direction of the first O ring and a compression direction of the first liquid seal material are almost perpendicular to each other.

3. The optical module according to claim 1, wherein the pedestal includes a step to dispose the first O ring and a groove in which the first liquid seal material is applied on an outer peripheral side of the step and in which the cover is fitted.

4. The optical module according to claim 3, wherein the step has a height larger than a thickness of the first O ring.

5. The optical module according to claim 1, wherein a thickness of the first liquid seal material is adjustable by striking the pedestal to a planar portion formed on the outer peripheral portion of the cover.

6. The optical module according to claim 1, wherein the cover and the emitting window are sealed with a second O ring and a hardened seal of a second liquid seal material such that the compression direction of the second O ring and the compression direction of the second liquid seal material are almost perpendicular to each other.

7. The optical module according to claim 6, wherein the emitting window has a step to dispose the second O ring and a planar portion to cause the emitting window to adhere to the cover with the second liquid seal material.

8. The optical module according to claim 1, wherein a cooling Peltier element is attached.

9. A method of making an optical module for a video device including optical components including a light source, a pedestal on which the optical components are mounted, a cover which is combined to the pedestal to seal the optical components, and an emitting window disposed in the cover to take light from the light source outside, the method comprising:
preparing the pedestal having a step portion to dispose an O ring thereon and a groove in which a liquid seal material is applied on an outer peripheral side of the step portion to fit the cover in the groove;
disposing the O ring, which is a loop of elastomer having a circular cross-section, on the step portion;
applying or disposing the liquid seal material in the groove;
fitting the cover in the groove to press the liquid seal material into the groove; and
adjusting a thickness of the liquid seal material by adjusting a screw to fix the cover to the pedestal.

10. The method of making an optical module according to claim 9, further comprising
thermally hardening the liquid seal material.

11. The optical module according to claim 6, wherein a thickness of the second liquid seal material is adjustable with a plurality of screws that fix the emitting window to the cover.

12. The optical module according to claim 6, wherein the second O ring is arranged at an optical components side inwardly from the second liquid seal material, and wherein the emitting window is fixed to the cover with a plurality of screws from an outside of the cover.

* * * * *